United States Patent
Yun et al.

(10) Patent No.: US 11,764,616 B2
(45) Date of Patent: Sep. 19, 2023

(54) EXTREMELY HIGH FREQUENCY WIRELESS POWER TRANSFER DEVICE, METHOD, AND SYSTEM USING ROTMAN LENS

(71) Applicant: KOREA ELECTRONICS TECHNOLOGY INSTITUTE, Seongnam-si (KR)

(72) Inventors: Chang Seok Yun, Gyeonggi-do (KR); Young Han Kim, Seoul (KR); Hyun Seuk Ahn, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 17/452,032

(22) Filed: Oct. 22, 2021

(65) Prior Publication Data
US 2023/0129420 A1    Apr. 27, 2023

(30) Foreign Application Priority Data

Oct. 22, 2021   (KR) .................. 10-2021-0141455

(51) Int. Cl.
*H02J 50/23* (2016.01)
*H02J 50/40* (2016.01)
*H02J 50/20* (2016.01)

(52) U.S. Cl.
CPC ............ *H02J 50/23* (2016.02); *H02J 50/20* (2016.02); *H02J 50/402* (2020.01)

(58) Field of Classification Search
CPC .. H02J 50/20; H02J 50/23; H02J 50/40; H02J 50/402; H01Q 3/28; H01Q 3/36
See application file for complete search history.

(56) References Cited

U.S. PATENT DOCUMENTS

2012/0326660 A1* 12/2012 Lu ................... H02J 50/20
                                                   320/108
2013/0162478 A1   6/2013 Roper et al.
(Continued)

FOREIGN PATENT DOCUMENTS

JP          2012-222523 A     11/2012
KR    10-2012-0065652 A      6/2012

OTHER PUBLICATIONS

Office Action dated May 25, 2023 in the corresponding Korean Application No. 10-2021-0141455.

*Primary Examiner* — Rexford N Barnie
*Assistant Examiner* — Rasem Mourad
(74) *Attorney, Agent, or Firm* — Knobbe, Martens, Olson & Bear, LLP

(57) ABSTRACT

This application relates to an extremely high frequency (mmWave) wireless power transfer device, method, and system using a Rotman lens. The device includes a radio frequency (RF) chain including transmitters individually generating signals of a mmWave band, and adjusting phase and amplitude of each generated signal. The device may also include a switch matrix connected to the RF chain, having a matrix structure, and generating a beam pattern where the adjusted signals are combined through the switches. The device may further include a Rotman lens connected to the switch matrix and performing a signal beamforming of the beam pattern according to predetermined transmission paths, an antenna part connected to the Rotman lens and radiating the beamformed signal, and a controller controlling at least one of the phase, amplitude, beam pattern, or transmission path of the signal so that the signal is radiated.

9 Claims, 7 Drawing Sheets

(56) References Cited

U.S. PATENT DOCUMENTS

| | | | |
|---|---|---|---|
| 2014/0292090 A1* | 10/2014 | Cordeiro | H02J 50/40 307/104 |
| 2016/0204643 A1* | 7/2016 | Manova-Elssibony | H02J 50/40 320/108 |
| 2018/0026586 A1* | 1/2018 | Carbone | H03F 1/0261 330/124 R |
| 2020/0119776 A1* | 4/2020 | Lorca Hernando | H04W 28/06 |
| 2022/0239010 A1* | 7/2022 | Hormis | H01Q 19/062 |

\* cited by examiner

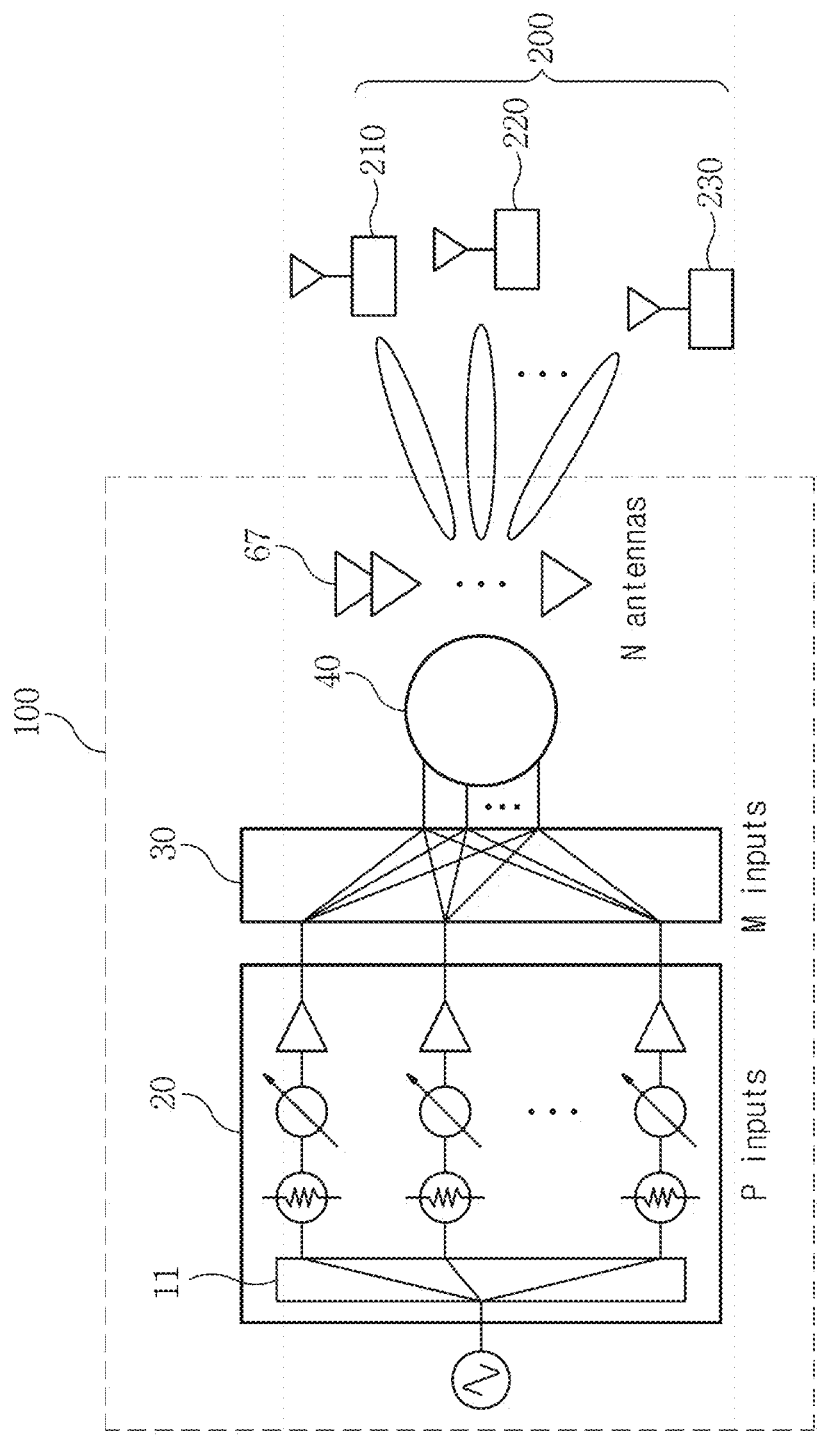

EXTREMELY HIGH FREQUENCY WIRELESS POWER TRANSFER DEVICE, METHOD, AND SYSTEM USING ROTMAN LENS

CROSS-REFERENCE TO RELATED APPLICATION

The present application claims priority to Korean Patent Application No. 10-2021-0141455 filed on Oct. 22, 2021 in the Korean Intellectual Property Office, which is incorporated herein in its entirety by reference.

BACKGROUND

Technical Field

The present disclosure relates to a wireless power transfer technology, and more particularly, to an extremely high frequency (mmWave) wireless power transfer device, method, and system for controlling a massive antenna array by using a Rotman lens in the mmWave environment.

Description of Related Technology

Compared to beamforming of the existing Sub-6 GHz band, beamforming based on extremely high frequency (mmWave) has a relatively narrow radiation angle because it can form a beam by integrating more antennas per unit area. Therefore, the mmWave-based beamforming has an advantage of effectively transmitting energy to a selected point with high transmission efficiency, but there is a problem of incurring an increase in cost because a very large number of antennas are used to obtain a high concentration.

SUMMARY

The present disclosure provides an extremely high frequency (mmWave) wireless power transfer device, method, and system using a Rotman lens and forming a variety of beam patterns at low cost.

The present disclosure provides an extremely high frequency wireless power transfer device, method, and system using a Rotman lens and enabling energy beam focusing on a receiving device even when it is located at various distances.

According to embodiments of the present disclosure, an extremely high frequency (mmWave) wireless power transfer device may include a radio frequency (RF) chain including a plurality of transmitters individually generating signals of a mmWave band, and adjusting phase and amplitude of each signal generated by the plurality of transmitters, a switch matrix connected to the RF chain, having a matrix structure of a plurality of switches, and generating a beam pattern in which the adjusted signals are combined through the plurality of switches, a Rotman lens connected to the switch matrix and performing a signal beamforming of the beam pattern generated by the switch matrix according to predetermined transmission paths, an antenna part connected to the Rotman lens and radiating the beamformed signal through a plurality of antennas, and a controller controlling at least one of the phase, amplitude, beam pattern, or transmission path of the signal so that the signal is radiated.

According to embodiments of the present disclosure, in case of having an analog structure, the RF chain may include a step attenuator and a phase shifter.

According to embodiments of the present disclosure, in case of having a digital structure, the RF chain may include digital I/Q.

According to embodiments of the present disclosure, in order to increase the number of cases for the beam pattern, the switch matrix may have a predetermined matrix structure formed of a plurality of switches.

According to embodiments of the present disclosure, the Rotman lens may change the phase and amplitude of each signal according to the transmission paths and transmit the changed signals to the antenna part.

According to embodiments of the present disclosure, the antenna part may perform coupling for a part of energy of the signal being radiated, and based on the coupling signal, the controller may monitor whether the signal being radiated through at least one of the plurality of antennas matches a user's target result.

According to embodiments of the present disclosure, an extremely high frequency (mmWave) wireless power transfer method implemented by a wireless power transfer device may include individually generating signals of a mmWave band and adjusting phase and amplitude of each generated signal, generating a beam pattern in which the adjusted signals are combined through a switch matrix formed of a plurality of switches, performing a signal beamforming of the generated beam pattern according to predetermined transmission paths of a Rotman lens, and radiating the beamformed signal through a plurality of antennas.

According to embodiments of the present disclosure, a wireless power transfer system may include a wireless power transfer device configured to wirelessly transfer energy using signals of an extremely high frequency (mmWave) band, and at least one receiving device configured to receive the transferred energy from the wireless power transfer device and store the received energy. The wireless power transfer device may include a radio frequency (RF) chain including a plurality of transmitters individually generating signals of the mmWave band, and adjusting phase and amplitude of each signal generated by the plurality of transmitters, a switch matrix connected to the RF chain, having a matrix structure of a plurality of switches, and generating a beam pattern in which the adjusted signals are combined through the plurality of switches, a Rotman lens connected to the switch matrix and performing a signal beamforming of the beam pattern generated by the switch matrix according to predetermined transmission paths, an antenna part connected to the Rotman lens and radiating the beamformed signal through a plurality of antennas, and a controller controlling at least one of the phase, amplitude, beam pattern, or transmission path of the signal so that the signal is radiated.

The wireless power transfer device, method, and system according to the present disclosure can form various beam patterns at low cost by combining an active phase control circuit and a Rotman lens. Contrary to a conventional art of transferring energy to a receiving device at a long distance or a predetermined distance, the wireless power transfer device, method, and system according to the present disclosure can transmit a focused beam to a receiving device located at any distance, thereby allowing the receiving device to efficiently charge energy.

BRIEF DESCRIPTION OF THE DRAWINGS

FIG. 4 is a diagram illustrating a process of transferring wireless power in a wireless power transfer system according to an embodiment of the present disclosure.

DETAILED DESCRIPTION

In case that a typical mmWave-based beamforming technique performs independent active phase control in units of individual antennas, there arises a problem that the price of a transmitter increases because a plurality of RF chains are required. In order to alleviate this problem, a hybrid beamforming scheme that combines digital beamforming and analog beamforming has been introduced. However, the hybrid beamforming scheme unfavorably requires a step attenuator and a phase shifter to control the phase and amplitude for each antenna.

Meanwhile, the Rotman lens is designed to adjust a transmission path formed via a metal strip pad and change a phase delivered to an individual antenna depending on an input port. This enables the Rotman lens to form a beam with a very simplified structure while adjusting the direction of the beam. However, this approach has a disadvantage in that the number of beams is limited according to the number of ports. In addition, because only a fixed beam form for long-range beamforming used in conventional radar, etc. is provided, it is difficult to be effectively used in the field of wireless power transfer targeting a mid-range that requires a beam focus control depending on the distance.

Hereinafter, an embodiment of the present disclosure will be described in detail with reference to the accompanying drawings. The present disclosure may, however, be embodied in many different forms and should not be construed as being limited to the embodiment set forth herein. Rather, this embodiment is provided so that the disclosure will be thorough and complete and will fully convey the scope of the disclosure to those skilled in the art. Accordingly, an embodiment described herein should be understood to include various modifications, equivalents, and/or alternatives.

In addition, techniques that are well known in the art and not directly related to the present disclosure are not described herein. This is to clearly convey the subject matter of the present disclosure by omitting an unnecessary explanation. Also, the terms are merely used for describing a particular embodiment but do not limit the embodiment. Singular forms are intended to include plural forms unless the context clearly indicates otherwise.

Figure 1:
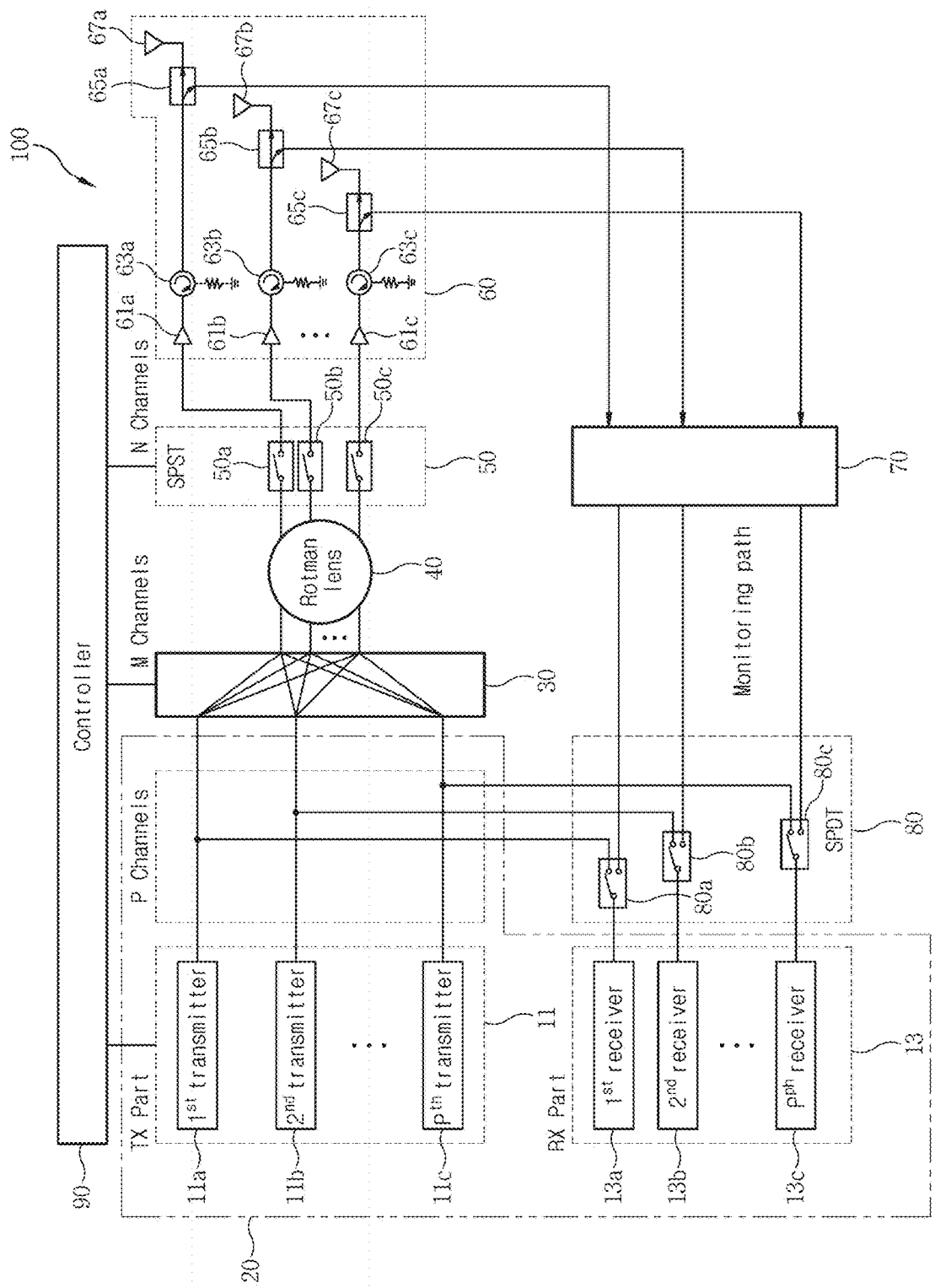
FIG. 1 is a diagram illustrating a wireless power transfer device according to an embodiment of the present disclosure.
Figure 2:
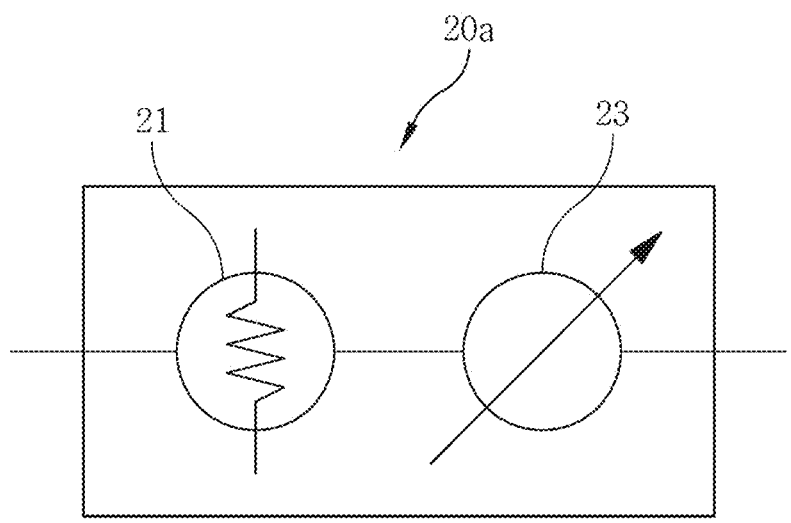
FIG. 2 is a diagram illustrating a wireless power transfer device having an analog structure according to an embodiment of the present disclosure.
Figure 3A:
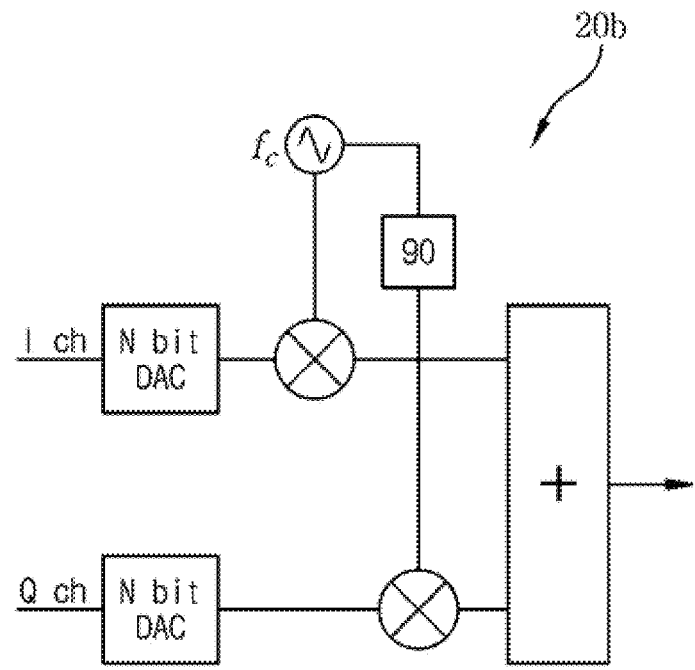
FIGS. 3A and 3B are diagrams illustrating a wireless power transfer device having a digital structure according to an embodiment of the present disclosure.
Figure 3B:
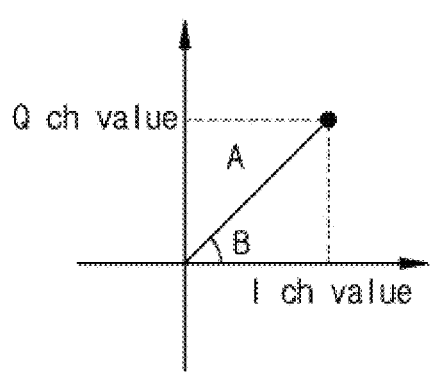

FIG. 1 is a diagram illustrating a wireless power transfer device according to an embodiment of the present disclosure. FIG. 2 is a diagram illustrating a wireless power transfer device having an analog structure according to an embodiment of the present disclosure. FIGS. 3A and 3B are diagrams illustrating a wireless power transfer device having a digital structure according to an embodiment of the present disclosure.

Referring to FIGS. 1 to 3B, the wireless power transfer device 100 forms a variety of beam patterns at low cost. The wireless power transfer device 100 is capable of transmitting a focused beam to a receiving device (not shown) located at any distance, thereby allowing the receiving device to efficiently charge energy. The receiving device is an apparatus capable of wireless charging and may include a smart phone, a tablet PC, a handheld PC, an Internet of Things (IoT) device, and the like. The wireless power transfer device 100 may include a transmitter part 11, a receiver part 13, a radio frequency (RF) chain 20, a switch matrix 30, a Rotman lens 40, a single pole single throw (SPST) switch part 50, an antenna part 60, an N:P combiner 70, a single pole double throw (SPDT) switch part 80, and a controller 90.

The transmitter part 11 individually generates signals of the mmWave band. To this end, the transmitter 11 may include a first transmitter 11a, a second transmitter 11b, . . . , and a P-th transmitter 11c (where 'P' is a natural number greater than 2). The generated signals may have the same phase or different phases and may have energy.

The receiver part 13 individually receives signals of the mmWave band received by a plurality of antennas 67a, 67b, and 67c in the antenna part 60, or individually receives coupling signals from a plurality of couplers 65a, 65b, and 65c in the antenna part 60. To this end, the receiver part 13 may include a first receiver 13a, a second receiver 13b, . . . , a P-th receiver 13c (where 'P' is a natural number greater than 2). In addition, the receiver part 13 including the plurality of receivers 13a, 13b, and 13c is capable of receiving several signals at the same time.

The RF chain 20 includes the plurality of transmitters 11a, 11b, and 11c, and the plurality of receivers 13a, 13b, and 13c, and may also include at least one of an amplifier, a filter, a mixer, an attenuator, or a detector. The RF chain 20 adjusts the phase and amplitude of each signal generated by the plurality of transmitters 11a, 11b, and 11c. For example, upon receiving P signals from the plurality of transmitters 11a, 11b, and 11c, the RF chain 20 adjusts the phase and amplitude of each signal and then outputs the adjusted P signals. In case of having an analog structure, the RF chain 20a includes a step attenuator 21 and a phase shifter 23 as shown in FIG. 2. The RF chain 20a can adjust the phase and amplitude of individual signal paths through the step attenuator 21 and the phase shifter 23, but it is limited in the modulation of data signals because a control speed is slower compared to digital I/Q. In case of having a digital structure, the RF chain 20b includes digital I/Q as shown in FIGS. 3A and 3B. The RF chain 20b controls a baseband digital I/Q signal and thereby obtains a plurality of phase and attenuator coefficients. Specifically, as shown in FIG. 3A, the RF chain 20b sets I/Q channels of the baseband, mixes a carrier of a reference phase to the I channel, mixes a carrier of 90° phase to the Q channel, and then combines the mixed I and Q values. Through this, as shown in FIG. 3B, the RF chain 20b can generate a carrier having various phases and amplitudes according to the I/Q values. That is, the RF chain 20b can control the phase and amplitude very precisely, and can modulate and insert data signals depending on the sampling rate performance of a digital-to-analog converter (DAC).

The switch matrix 30 is connected to the RF chain 20 and receives signals from the RF chain 20 through a total of P individual input ports. The switch matrix 30 outputs the inputted P signals to M output ports (where 'M' is a natural number). That is, the switch matrix 30 is a matrix composed of a plurality of switches connecting a plurality of inputs to a plurality of selected outputs. The M output ports are connected to the same number of input ports of the Rotman lens 40. The switch matrix 30 is formed of a plurality of switches (not shown) and generates a beam pattern in which the adjusted signals are combined using such switches. Specifically, the switch matrix 30 is a matrix structure of switches capable of path control and is capable of generating a primary signal arrangement through on/off path control. In order to increase the number of cases for a signal beam pattern, the switch matrix 30 may have a predetermined matrix structure formed of a plurality of switches. For example, the switch matrix 30 may have a two-dimensional matrix structure having a certain size such as 'a×a' or 'a×b' (where 'a' and 'b' are different natural numbers).

The Rotman lens 40 is connected to the switch matrix 30. The Rotman lens 40 performs beamforming of the signal beam pattern generated by the switch matrix 30 according to predetermined transmission paths and thereby generates a secondary signal arrangement with various beam patterns. The Rotman lens 40 has M input ports and N output ports (where 'M' and 'N' are natural numbers). The Rotman lens 40 changes the phase and amplitude of each signal according to the transmission paths, and transmits the changed signals to a plurality of antennas. Specifically, a signal from the i-th input of the Rotman lens 40 to the j-th antenna is transformed according to a transfer coefficient $h_{i,j}$ that reflects the change in phase and amplitude, and thus there are N×M transfer coefficients in total. That is, when a signal inputted through the i-th input port and having a certain phase and amplitude is $s_i$, a signal $s_{ant}(j)$ applied to the j-th antenna through the j-th output port can be expressed as in Equation 1.

$$s_{ant}(j) = \sum_{i=1}^{M} s_i \cdot h_{i,j} \qquad \text{[Equation 1]}$$

As described above, the wireless power transfer device 100 may diversify signals individually applied to the respective antennas and, as a result, generate a plurality of beam patterns exceeding a limited number. Meanwhile, in case of receiving a signal rather than radiating a signal, the Rotman lens 40 may deliver the received signal to the RF chain 20 in the reverse order of the process for radiating the signal.

The SPST switch part 50 has a structure in which a plurality of SPST switches 50a, 50b, and 50c are respectively connected to output ports of the Rotman lens 40 and input ports of the antenna part 60. The SPST switch has only one input contact and only one output contact, which can connect or disconnect a signal path. That is, when each of the SPST switches 50a, 50b, and 50c is closed, a signal path between the output port of the Rotman lens 40 and the input port of the antenna part 60 is on. When each SPST switch is open, the signal path is off.

The antenna part 60 is connected to the SPST switch part 50. The antenna part 60 radiates the beamformed signal or receives a signal from a receiving device. The antenna part 60 may include a plurality of RF amplifiers 61a, 61b, and 61c, a plurality of isolators 63a, 63b, and 63c, a plurality of couplers 65a, 65b, and 65c, and a plurality of antennas 67a, 67b, and 67c. For each channel, the RF amplifier, the isolator, the coupler, and the antenna are connected in order. That is, the antenna part 60 radiates each signal outputted from the SPST switch part 50 through the RF amplifier, the isolator, the coupler, and the antenna. In addition, the antenna part 60 may support signal monitoring by means of coupling for energy transfer from the signals passing through the plurality of couplers 65a, 65b, and 65c. Meanwhile, in case of receiving a signal rather than radiating a signal, the antenna part 60 may deliver the received signal to the SPST switch part 50 in the reverse order of the process for radiating the signal.

The N:P combiner 70 forms a monitoring path for transferring the coupling signals received from the plurality of couplers 65a, 65b and 65c to the receiver part 13. The N:P combiner 70 may be variously configured depending on the ratio of N and P. For example, if N is 256 and P is 16, the N:P combiner 70 is composed of sixteen 16:1 combiners.

The SPDT switch part 80 includes a plurality of SPDT switches 80a, 80b, and 80c. The SPDT switch part 80 selectively transmits signals received from the RF chain 20 or the N:P combiner 70 to the receiving part 13. The SPDT switch has only one output contact and two input contacts, which can selective one of two signal paths. The two input contacts are connected to the RF chain 20 and the N:P combiner 70, respectively, and the one output contact is connected to the receiving part 13. That is, each SPDT switch of the SPDT switch part 80 connects the output contact and the input contact connected to the RF chain 20 when delivering a signal received from the RF chain 20 to the receiving part 13, and connects the output contact and the input contact connected to the N:P combiner 70 when delivering a signal received from the N:P combiner 70 to the receiving part 13. Meanwhile, the SPDT switch part 80 may perform selectively switching for each signal received from the RF chain 20 for signal time division.

The controller 90 performs the overall control of the wireless power transfer device 100. That is, the controller 90 controls at least one of the transmitter part 11, the receiver part 13, the RF chain 20, the switch matrix 30, the Rotman lens 40, the SPST switch part 50, the antenna part 60, the N:P combiner 70, or the SPDT switch part 80.

For example, the controller 90 controls the RF chain 20 to adjust the phase and amplitude of a signal, and controls the respective switches included in the SPST switch part 50 and the SPDT switch part 80. Also, the controller 90 may control the SPDT switch part 80 for selective signal time division.

The controller 90 analyzes a signal received from the receiving device, performs recognition and location tracking of the receiving device, establishes a transfer strategy for energy transfer, and transfers energy to the receiving device in accordance with the established transfer strategy. Specifically, the controller 90 identifies a phase difference occurring at the plurality of antennas 67a, 67b, and 67c through a pilot signal packet and received data contained in the received signal, and estimates the location of the receiving device through the identified phase difference. To allow the phase and amplitude of a carrier to be recognized in an external noise environment, the pilot signal packet contains a preamble, a unique ID value of the receiving device, and a pilot tone. The controller 90 recognizes the pilot signal packet through preamble detection and then detects the phase included in the received data through the pilot tone.

In addition, the controller 90 estimates individual phase values through time division selection of the individual antennas 67a, 67b, and 67c of the antenna part 60. When the antenna part 60 receives a plurality of signals at the same time, the controller 90 reduces a time division frequency to identify a phase and amplitude difference, and estimates the location of the receiving device through the identified difference.

In addition, the controller 90 controls the antenna part 60 to monitor a signal being radiated. Based on coupling signals from the plurality of couplers 65a, 65b, and 65c, the controller 90 can monitor whether a signal being radiated through at least one of the plurality of antennas matches a user's target result. That is, the user can know whether wireless power transfer is being performed in accordance with his/her intention.

Meanwhile, although not shown in the drawings, the wireless power transfer device 100 may further include an input unit and a storage. The input unit receives a user input from the user. The user input may be information on a receiving device that the user desires to transfer energy, or may include energy transfer related information such as energy transfer strength and energy transfer time. The storage stores a program or algorithm for operating the wireless power transfer device 100. In addition, the storage stores the user input, a processed data or result of the controller 90, and the like. The storage may include at least one storage medium among a flash memory type, a hard disk type, a multimedia card micro type, a card type memory (e.g., SD or XD memory), a random access memory (RAM), a static random access memory (SRAM), a read-only memory (ROM), a programmable ROM (PROM), an electrically erasable PROM (EEPROM), a magnetic memory, a magnetic disk, and an optical disk.

Figure 5:
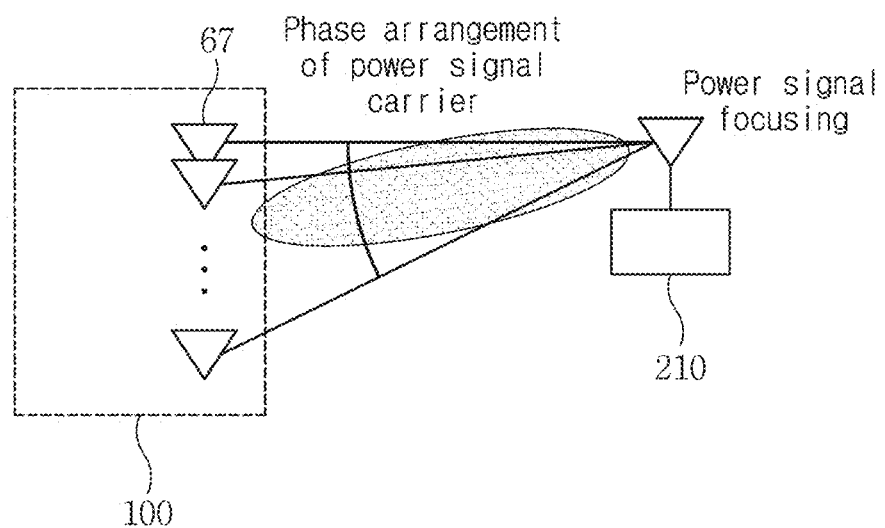
FIG. 5 is a diagram illustrating a beam focusing process in a wireless power transfer system according to an embodiment of the present disclosure.

FIG. 4 is a diagram illustrating a process of transferring wireless power in a wireless power transfer system according to an embodiment of the present disclosure. FIG. 5 is a diagram illustrating a beam focusing process in a wireless power transfer system according to an embodiment of the present disclosure.

Referring to FIGS. 4 and 5, the wireless power transfer system includes the wireless power transfer device 100, as described above, and at least one receiving device 200. The wireless power transfer system is a system for wirelessly transferring power from the wireless power transfer device 100 to the at least one receiving device 200. This system enables efficient energy transfer at low cost by minimizing expensive phase control circuitry.

The wireless power transfer device 100 delivers signals of various phases transmitted through the RF chain 20 and the switch matrix 30 to M input ports of the Rotman lens 40, changes the phases and amplitudes of the signals according to the transmission paths in the Rotman lens 40, and radiates the signals to the receiving device 200 through N antennas 67.

In the wireless power transfer device 100, to reduce the number of power amplifiers, that is, to design the number P of power amplifiers smaller than the number N of antennas 67, the power amplifiers may be placed at the front of the switch matrix 30. In particular, in order to solve the conventional problem of radiating signals based on a long distance because it is impossible to correct a beam form according to a distance due to a fixed phase, the wireless power transfer device 100 adjusts a beam form of signals and performs a beam focusing on a desired receiving device (e.g., a first device 210), thereby increasing energy charging efficiency of the receiving device. That is, the wireless power transfer device 100 can focus power signals by individually adjusting the phases of the antennas 67 so that the signals of the same phase can reach an antenna of the first device 210. The receiving device 200 may include a plurality of devices 210, 220, and 230. Each receiving device is a device capable of wireless charging and may include a smartphone, a tablet PC, a handheld PC, an IoT device, etc.

Figure 6:
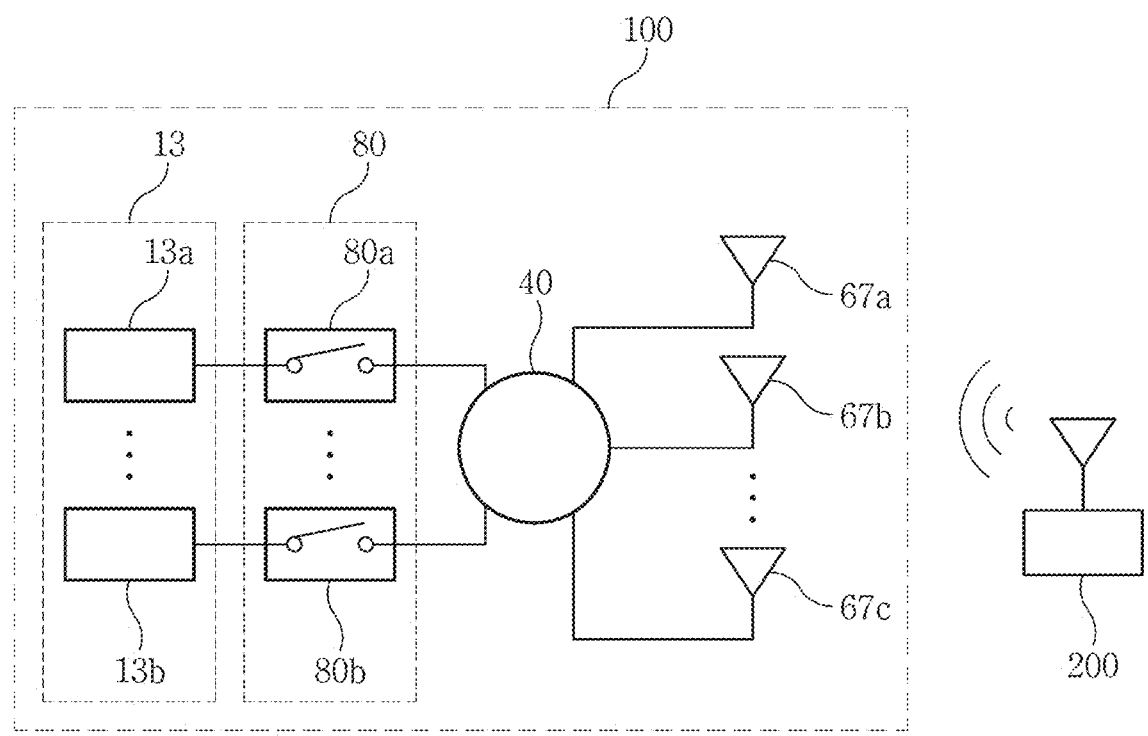
FIG. 6 is a diagram illustrating a process of estimating the location of a receiving device in a wireless power transfer system according to an embodiment of the present disclosure.

FIG. 6 is a diagram illustrating a process of estimating the location of a receiving device in a wireless power transfer system according to an embodiment of the present disclosure.

Referring to FIG. 6, the wireless power transfer system estimates the location of the receiving device 200 through communication between the wireless power transfer device 100 and the receiving device 200 so that wireless power transfer can be effectively performed. The wireless power transfer device 100 estimates a phase difference occurring at the plurality of antennas 67a, 67b, and 67c by using a pilot signal packet and, based on this, estimates a signal suitable for an individual antenna for effective energy transfer. To allow the phase and amplitude of a carrier to be recognized in an external noise environment, the pilot signal packet is composed of a preamble, a unique ID value of the receiving device, and a pilot tone. The pilot signal packet is recognized through preamble detection, and then the phase included in data received together with the pilot signal packet is detected through the pilot tone.

Meanwhile, the wireless power transfer device 100 may estimate individual phase values through time division selection of the plurality of antennas 67a, 67b, and 67c. In addition, when receiving a plurality of signals simultaneously through a plurality of reception paths, the wireless power transfer device 100 may reduce a time division frequency to identify a phase and amplitude difference of the received signals.

Figure 7:
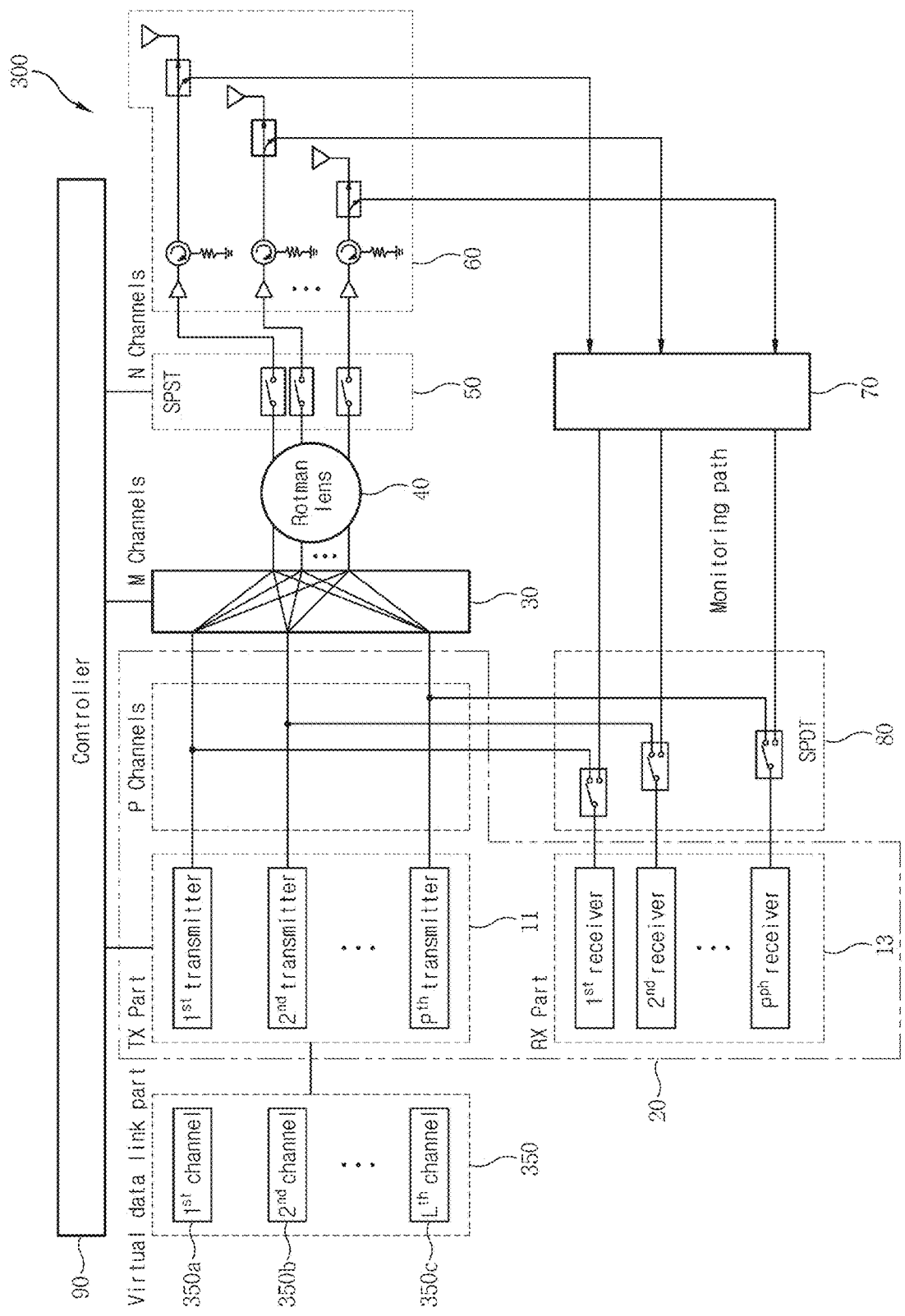
FIG. 7 is a diagram illustrating a wireless power transfer device according to another embodiment of the present disclosure.

FIG. 7 is a diagram illustrating a wireless power transfer device according to another embodiment of the present disclosure.

Referring to FIGS. 1 and 7, the wireless power transfer device 300 can be utilized not only for energy transfer but also for data transmission. To this end, the wireless power transfer device 300 shown in FIG. 7 further includes a virtual data link part 350 at the front of the transmitter part 11 and the RF chain 20 of the wireless power transfer device 100 shown in FIG. 1. Hereinafter, the description of elements of the wireless power transfer device 300 overlapping those of the wireless power transfer device 100 will be omitted.

The virtual data link part 350 includes a plurality of virtual data link channels 350a, 350b, and 350c. The virtual data link channels do not physically select the channel of the single Rotman lens 40 to transmit data, but are link channels for dividing and inputting a data stream to the input channels through inverse calculation so that data signals can be effectively transmitted to a specific receiving device through the plurality of antennas. Through this, the virtual data link part 350 supports transmission of data signals to a receiving device desired by the user. The virtual data link part 350 may also be used when receiving a signal. For example, if the same weight as in case of transmission is applied to signals simultaneously collected from the plurality of antennas by the controller 90, the virtual data link part 350 may obtain data of the user's desired receiving device. When data is transmitted at the same time, interference with other virtual data link channels may occur, and such interference may affect data transmission/reception. Accordingly, the controller 90 sets the selected virtual data link channel to have the minimum interference. In addition, the sum of the signal and noise of any other virtual data link channel transmitted toward the selected receiving device may be expressed as a signal to interference and noise ratio (SINR), and the controller 90 may set a weight value so that the SINR is minimized.

A signal through the virtual data link channel may have a general packet structure of wireless communication. For example, a sync is located at the beginning of a packet, followed by configuration parameters such as a source, a destination, and a mode, a data payload, and a cyclic redundancy check (CRC).

In addition, space orthogonality between virtual data link channels allows communication to be performed with the use of various standards. That is, the virtual data link part 350 not only supports communication with an active receiving device, but also supports communication with a passive receiving device using backscatter.

Figure 8:
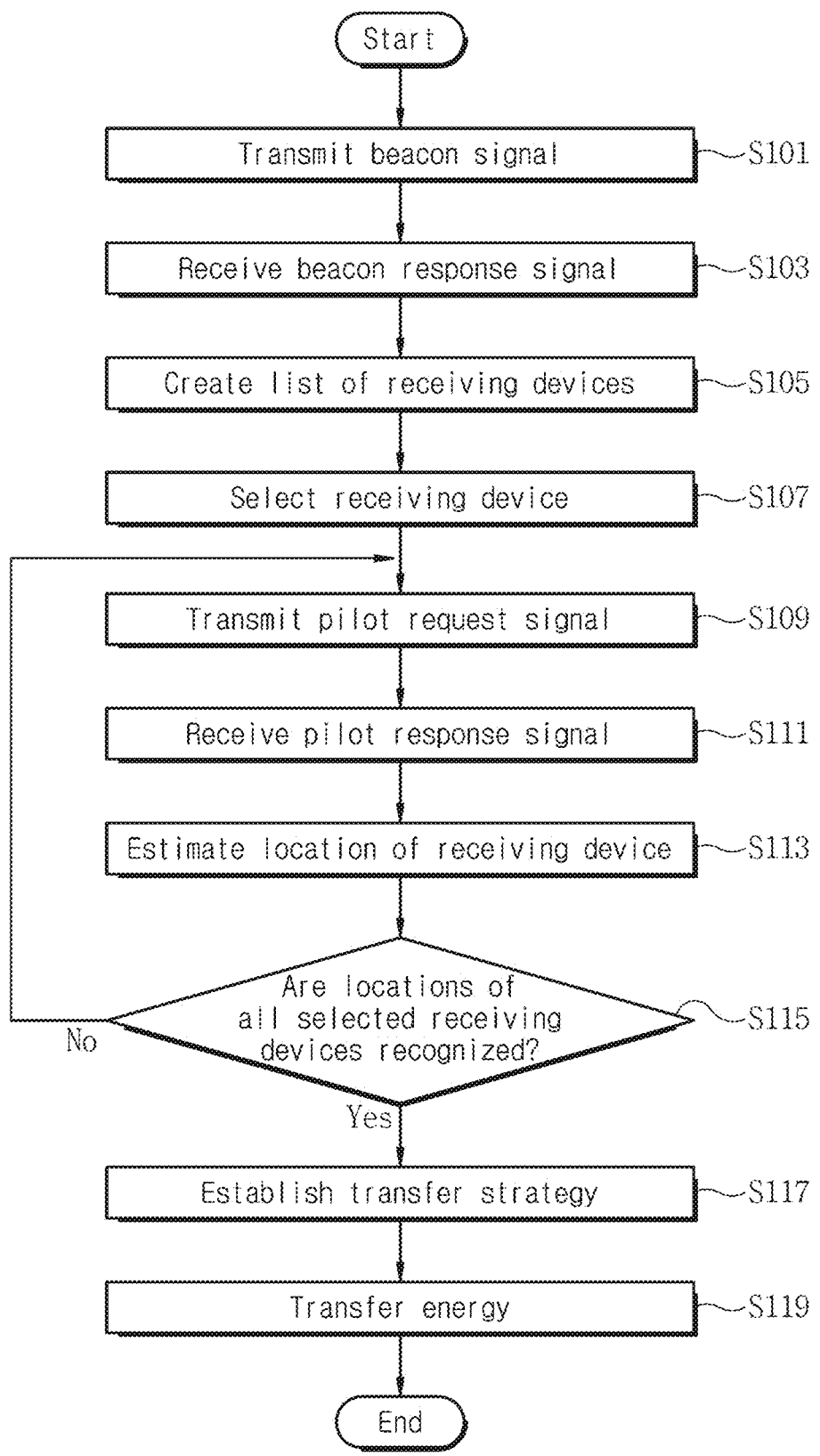
FIG. 8 is a diagram illustrating a wireless power transfer method according to an embodiment of the present disclosure.

FIG. 8 is a diagram illustrating a wireless power transfer method according to an embodiment of the present disclosure.

Referring to FIGS. 1 and 8, the wireless power transfer method can form various beam patterns at low cost by combining an active phase control circuit and a Rotman lens. Contrary to a conventional method of transferring energy to a receiving device at a long distance or a predetermined distance, the wireless power transfer method can transmit a focused beam to a receiving device located at any distance, thereby allowing the receiving device to efficiently charge energy.

At step S101, the wireless power transfer device 100 transmits a beacon signal. Specifically, the wireless power transfer device 100 initially transmits the beacon signal of a predetermined frequency band so that the receiving devices can know the existence of the wireless power transfer device.

At step S103, the wireless power transfer device 100 receives a beacon response signal. Specifically, the wireless power transfer device 100 receives the beacon response signal, which is a response signal to the beacon signal, from each of the receiving devices that have received the beacon signal. The beacon response signal contains a unique ID value of the receiving device and basic information.

At step S105, the wireless power transfer device 100 creates a list of receiving devices. Specifically, based on the received beacon response signals, the wireless power transfer device 100 creates the list of receiving devices that exist around the wireless power transfer device 100.

At step S107, the wireless power transfer device 100 selects a receiving device. That is, the wireless power transfer device 100 selects a target receiving device to which energy will be wirelessly transferred. At this time, the wireless power transfer device 100 may select the receiving device in response to a user input or automatically select the receiving device according to a predetermined criterion or rule.

At step S109, the wireless power transfer device 100 transmits a pilot request signal. That is, the wireless power transfer device 100 transmits the pilot request signal to the selected receiving device. The pilot request signal may be a signal for estimating the phase of each antenna of the wireless power transfer device 100.

At step S111, the wireless power transfer device 100 receives a pilot response signal. That is, the wireless power transfer device 100 receives the pilot response signal from the selected receiving device. The pilot response signal is received through each of individual antennas of the wireless power transfer device 100.

At step S113, the wireless power transfer device 100 estimates the location of the receiving device. Specifically, the wireless power transfer device 100 estimates a phase difference among the respective antennas based on the pilot response signals and thereby estimates the location of the receiving device.

At step S115, the wireless power transfer device 100 checks whether the locations of all the selected receiving devices are recognized. That is, the wireless power transfer device 100 determines whether the estimation of the locations of all selected receiving devices is completed. If it is determined that the locations of all the receiving devices are estimated, the wireless power transfer device 100 performs step S117. If it is determined that the locations of all the receiving devices are not estimated, the wireless power transfer device 100 performs the step S109 again.

At step S117, the wireless power transfer device 100 establishes an energy transfer strategy. For example, the wireless power transfer device 100 determines whether to transfer energy in a time division transfer scheme or a simultaneous transfer scheme. At this time, the wireless power transfer device 100 determines a transfer scheme in consideration of the locations of all selected receiving devices, the energy charging states of the receiving devices, and the like, and establishes the energy transfer strategy according to the determined transfer scheme.

At step S119, the wireless power transfer device 100 transfers energy. That is, the wireless power transfer device 100 transmits energy to the selected receiving device in accordance with the established energy transfer strategy.

The above-described methods according to various embodiments of the present disclosure may be implemented as instructions stored in a non-transitory computer-readable recording medium in a programming module form. When the instructions are executed by a processor, the processor may execute a function corresponding to the instructions. The non-transitory computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler. The hardware devices described above may be configured to operate as one or more software modules to perform the operations of the various embodiments, and vice versa. While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. An extremely high frequency (EHF) wireless power transfer device comprising:
   a radio frequency (RF) chain including a plurality of transmitters configured to individually generate signals of a mmWave band, and adjust phase and amplitude of each signal generated by the plurality of transmitters;
   a switch matrix connected to the RF chain, and configured to generate a beam pattern in which the adjusted signals are combined;
   a Rotman lens connected to the switch matrix and configured to perform a signal beamforming of the beam pattern generated by the switch matrix according to predetermined transmission paths;

a plurality of antennas connected to the Rotman lens and configured to radiate the beamformed signal to at least one receiving device, the plurality of antennas being configured to receive signals from the at least one receiving device;

the RF chain further comprising a plurality of receivers configured to receive the generated signals transmitted from the plurality of transmitters and the received signals from the plurality of antennas;

one or more single pole double throw (SPDT) switches connected to the receivers and configured to selectively transmit the generated signals from the plurality of transmitters and the received signals from the plurality of antennas; and a controller configured to control at least one of the phase, amplitude, beam pattern, or transmission path of the signal so that the signal is radiated, the controller being further configured to:

analyze the received signals received from the at least one receiving device, identify a phase difference occurring at the plurality of antennas through a pilot signal packet and received data contained in the received signals, estimate a location of the at least one receiving device through the identified phase difference, determine a transfer scheme based on the location of the at least one receiving device, and perform energy transfer based on the determined transfer scheme.

2. The device of claim 1, wherein the RF chain has an analog structure and includes a step attenuator and a phase shifter.

3. The device of claim 1, wherein the RF chain has a digital structure and includes digital I/Q.

4. The device of claim 1, wherein the Rotman lens is configured to change the phase and amplitude of each signal according to the transmission paths and transmit the changed signals to the plurality of antennas.

5. The device of claim 1, further comprising a plurality of couplers configured to perform coupling for a part of energy of the signal being radiated, and wherein based on the coupling signal, the controller is configured to monitor whether the signal being radiated through at least one of the plurality of antennas matches a user's target result.

6. A wireless power transfer system comprising:

the wireless power transfer device of claim 1; and the at least one receiving device configured to receive the transferred energy from the wireless power transfer device and store the received energy.

7. The device of claim 1, wherein the pilot signal packet contains a preamble, a unique ID value of the at least one receiving device, and a pilot tone, wherein the controller is further configured to recognize the pilot signal packet through preamble detection and detect the phase included in the received data through the pilot tone.

8. The device of claim 1, wherein the controller is further configured to estimate individual phase values through time division selection of the antennas, wherein, when the plurality of antennas receive a plurality of signals at the same time, the controller is configured to reduce a time division frequency to identify a phase and amplitude difference, and estimate the location of the at least one receiving device through the identified difference.

9. The device of claim 1, wherein the plurality of antennas and the one or more SPDT switches are connected without intervening of the Rotman lens such that the signals received by the plurality of antennas from the at least one receiving device do not pass the Rotman lens.

* * * * *